United States Patent [19]
Tsai

[11] Patent Number: 5,753,313
[45] Date of Patent: May 19, 1998

[54] METHOD FOR COATING METAL COOKWARE

[75] Inventor: Tung-Hung Tsai, Kaohsiung Hsien, Taiwan

[73] Assignee: Sheh Jone Enterprises Co., Ltd., Kaohsiung Hsien, Taiwan

[21] Appl. No.: 773,402

[22] Filed: Dec. 26, 1996

[51] Int. Cl.⁶ .................. C23C 4/06; C23C 4/16
[52] U.S. Cl. .......... 427/449; 427/447; 427/456; 427/328; 427/409
[58] Field of Search .................. 427/456, 447, 427/449, 328, 409

[56] References Cited

U.S. PATENT DOCUMENTS

| | | | |
|---|---|---|---|
| 5,069,937 | 12/1991 | Wall | 427/227 |
| 5,411,771 | 5/1995 | Tsai | 427/456 |
| 5,462,769 | 10/1995 | Tsai | 427/307 |

FOREIGN PATENT DOCUMENTS

| | | | |
|---|---|---|---|
| 44 05 101 A1 | 7/1994 | Germany | 427/456 |

*Primary Examiner*—Katherine A. Bareford
*Attorney, Agent, or Firm*—Renner, Otto, Boisselle & Sklar, P.L.L.

[57] ABSTRACT

A method for coating metal cookware having a cooking surface includes the steps of: (1) roughening and cleaning the cooking surface of the metal cookware; (2) applying a metallic scratch-resistant layer onto the roughened and cleaned cooking surface by electric-arc spraying; and (3) applying an anti-stick layer onto the scratch-resistant layer. The step (2) includes electric-arc spraying a stainless steel and an aluminum alloy onto the cooking surface of the metal cookware in order to improve corrosion resistance of the scratch-resistant layer. The stainless steel consists of less than 0.2% by weight of carbon, 17–20% by weight of chromium, 7–10% by weight of nickel and the remainder being iron. The aluminum alloy consists of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum.

2 Claims, 3 Drawing Sheets

METHOD FOR COATING METAL COOKWARE

BACKGROUND OF THE INVENTION

1. Field of the Invention

This invention relates to a method for coating metal cookware, more particularly to a method for coating metal cookware in order to provide an anti-stick layer and a metallic scratch-resistant layer with enhanced corrosion-resistance on a surface thereof so as to enable the metal cookware to have a relatively long service life.

2. Description of the Related Art

U.S. Pat. Nos. 5,411,711 and 5,462,769 by the applicant disclose a method for coating metal cookware so as to provide a metallic scratch-resistant and an anti-stick cooking surface thereto. The anti-stick layer of the coating of U.S. Pat. No. 5,462,769 has improved resistance against rusting when compared to that of U.S. Pat. No. 5,411,711. The disclosures of the aforementioned U.S. Patents are incorporated herein by reference.

U.S. Pat. No. 5,069,937 discloses a method of preparing a roughened surface for subsequent coating with a fluoro polymer in a liquid medium. In this method, the surface is thermally sprayed with a stainless steel alloy, the chromium content of which is increased over that of standard stainless steel in order to prevent the formation of corrosion. The stainless steel for carrying out the method is 20 to 35% by weight of chromium, 8 to 15% by weight of nickel, 0.1% maximum by weight of carbon, 2% maximum by weight of manganese, and 0.4% maximum by weight of silicon, with the remainder being iron and incidental impurities. However, rusting is still observed on a surface of a metal substrate when the latter, which was sprayed with the stainless steel with an excess of chromium by using the above-mentioned method, is boiled in 5% salt water for 20 minutes and is cooled at room temperature for 72 hours.

SUMMARY OF THE INVENTION

The object of the present invention is to provide a method for coating metal cookware in order to provide a scratch-resistant layer with improved corrosion resistance when compared to the prior art.

According to the present invention, a method for coating metal cookware having a cooking surface includes the steps of: (1) roughening and cleaning the cooking surface of the metal cookware; (2) applying a metallic scratch-resistant layer onto the roughened and cleaned cooking surface by electric-arc spraying; and (3) applying an anti-stick layer onto the scratch-resistant layer. The step (2) includes electric-arc spraying a stainless steel and an aluminum alloy onto the cooking surface of the metal cookware in order to improve corrosion resistance of the scratch-resistant layer. The stainless steel consists of less than 0.2% by weight of carbon, 17–20% by weight of chromium, 7–10% by weight of nickel and the remainder being iron. The aluminum alloy consists of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum. The scratch-resistant layer contains essentially iron, chromium, aluminum, nickel and titanium. Preferably, the thickness of the scratch-resistant layer is up to 150 µm.

BRIEF DESCRIPTION OF THE DRAWINGS

Other features and advantages of the present invention will become apparent in the following detailed description of a preferred embodiment, with reference to the accompanying drawings, in which.

DETAILED DESCRIPTION OF THE PREFERRED EMBODIMENT

Figure 1:
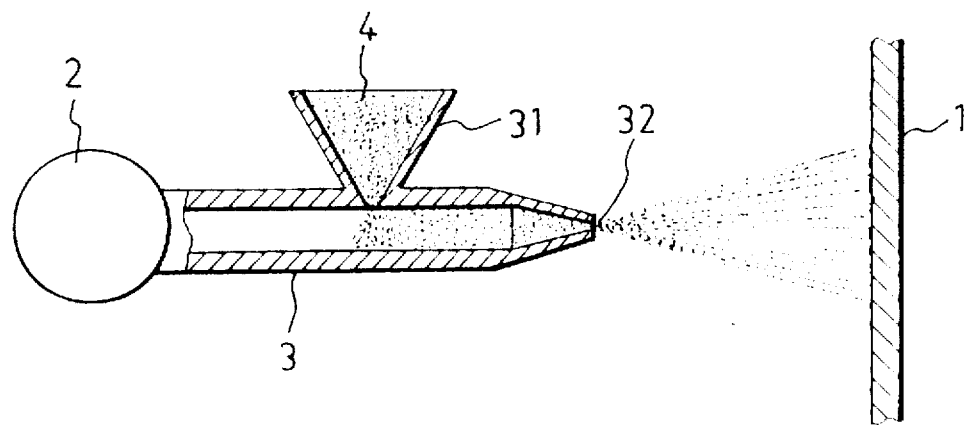
FIG. 1 shows aluminum oxide particles blasted against a cooking surface of a metal cookware to roughen and clean the cooking surface.

Before the present invention is described in greater detail, it should be noted that like elements are indicated by the same reference numerals throughout the disclosure.

A cast metal cookware 1, which may be made of copper, aluminum, iron or stainless steel, is provided and has a cooking surface. Referring to FIG. 1, fine aluminum oxide particles 4 of 60–80 mesh are contained in a funnel 31 which is connected to a nozzle 3. The nozzle 3 is connected to a device 2 containing compressed gas therein. The pressure of the compressed gas is about 5–8 kg/cm$^2$. The metal cookware 1 is located at a proper distance from a nozzle exit 32 of the nozzle 3. The aluminum oxide particles 4 are propelled through the nozzle 3 by the compressed gas onto the cooking surface in order to roughen and clean the cooking surface. The roughened and cleaned cooking surface has an average roughness of Ra 4.5–5.5 µm. The cooking surface is roughened and cleaned so as to facilitate the attachment and bonding of a further coating thereon.

Figure 2:
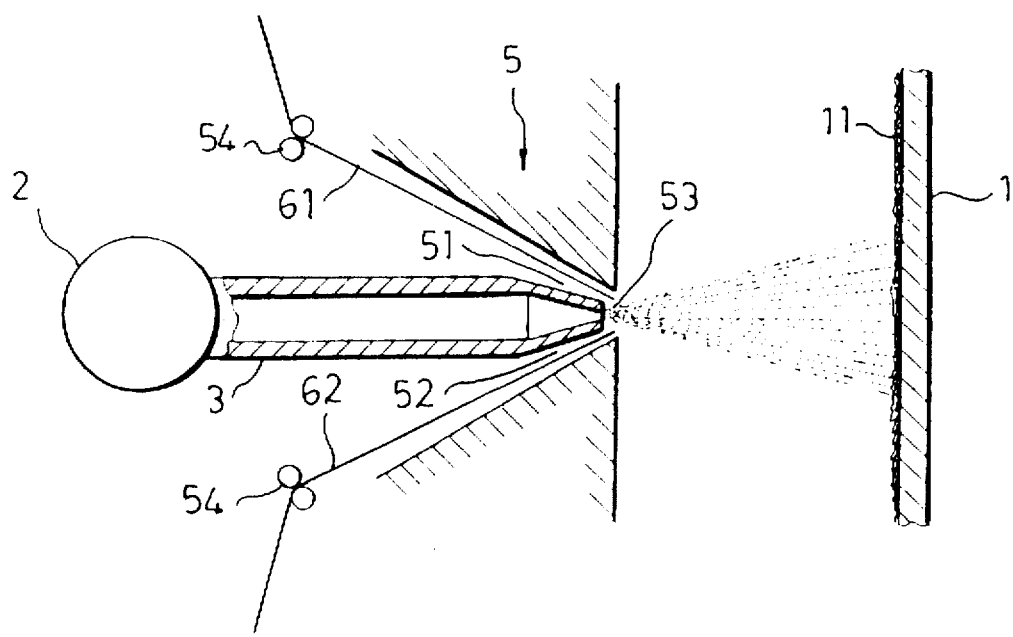
FIG. 2 shows a metallic scratch-resistant layer applied onto the roughened and cleaned cooking surface in FIG. 1.

FIG. 2 shows a scratch-resistant layer 11 applied onto the roughened and cleaned cooking surface by electric-arc spraying. An electric arc device 5 is mounted adjacent to the nozzle 3 and is conducted at a temperature of 4500°–8000° C., under a pressure of 5–8 kg/cm$^2$, and using a voltage of 30–40 V and a direct current of 100–300 A. Two metal wires 61, 62 are respectively fed, by means of two roller devices 54, into the electric arc device 5 along two passages 51, 52 toward an opening 53. One of the metal wires 61 is made of a stainless steel which consists of less than 0.2% by weight of carbon, 17–20% by weight of chromium, 7–10% by weight of nickel and the remainder being iron. The other metal wire 62 is made of an aluminum alloy which consists of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum. It is noted that the metal cookware 1 is located from the opening 53 at a distance of about 20–50 cm. The metal wires 61, 62 are melted by means of the electric arc device 5 and are propelled by the compressed gas in the device 2 so as to be sprayed onto the roughened and cleaned cooking surface at a speed of about 100–300 m/sec, thus forming the scratch-resistant layer 11. The melted metal wires 61, 62 cool at a rate of 1,000,000 DGE/°F./sec while they are sprayed onto the roughened and cleaned cooking surface from the opening 53. The scratch-resistant layer 11 is formed on the roughened and cleaned cooking surface at a temperature between 60° C. and 150° C. so as to prevent deformation of the metal cookware 1. Thus, even if a thin metal cookware is used, deformation will not occur. The scratch-resistant layer 11 formed on the cooking surface has a thickness preferably of about 150 μm and contains essentially iron, chromium, aluminum, nickel and titanium which provides improved corrosion resistance for the metal cookware 1, as will be described later. It is noted that the metal cookware 1 is thicker than the metal cookware of the prior art. Accordingly, the corrosion resistance of the metal cookware 1 is increased. It should be understood that the temperature required for the electric arc heating is dependent on the material used for the scratch-resistant layer 11.

The characteristics of the metal elements which are contained in the scratch-resistant layer 11 are as follows:

1. Iron is the main substrate material and provides a desired strength for the coating on the metal cookware.

Iron may become a steel when the carbon content thereof is less than 0.2% by weight.

2. Chromium may form a chromium oxide film on the bottom surface of the steel which is a corrosion resistant film to high temperature, sulfurous acid, and high temperature hydrogen gas.

3. Aluminum is the main substrate material of the aluminum alloy and has good corrosion resistance.

4. Nickel may increase the corrosion resistance to sulfuric acid.

5. Titanium can convert carbon into a stable carbide in order to prevent the precipitation of carbon at the grain boundary, thereby avoiding inter-granular corrosion, and in order to increase the hardness of the scratch-resistant layer 11.

Figure 3:
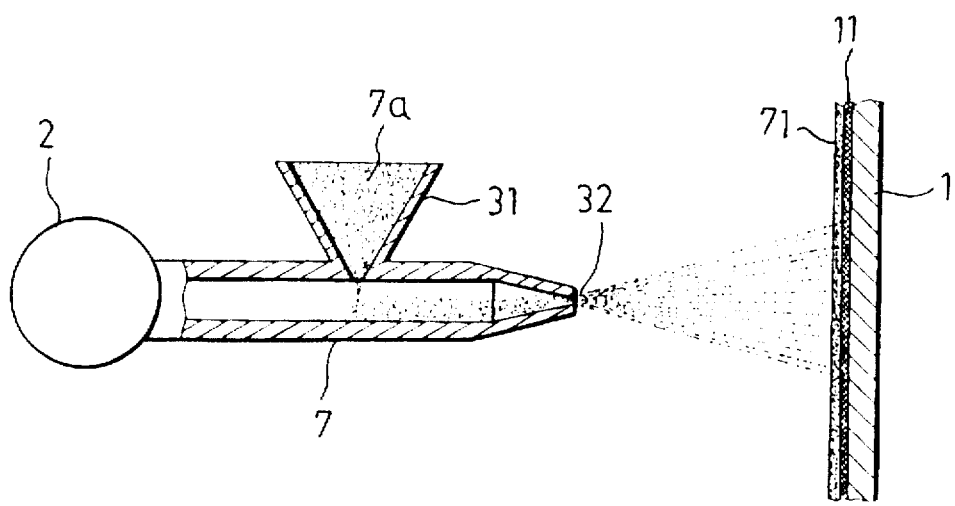
FIG. 3 shows a first coating of an anti-stick layer applied over the scratch-resistant layer in FIG. 2.
Figure 4:
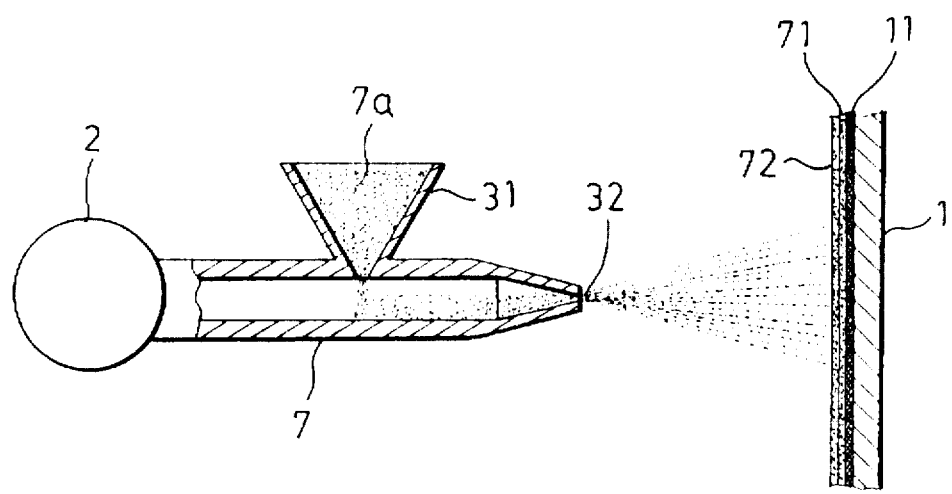
FIG. 4 shows a second coating of the anti-stick layer applied on the first coating in FIG. 3.
Figure 5:
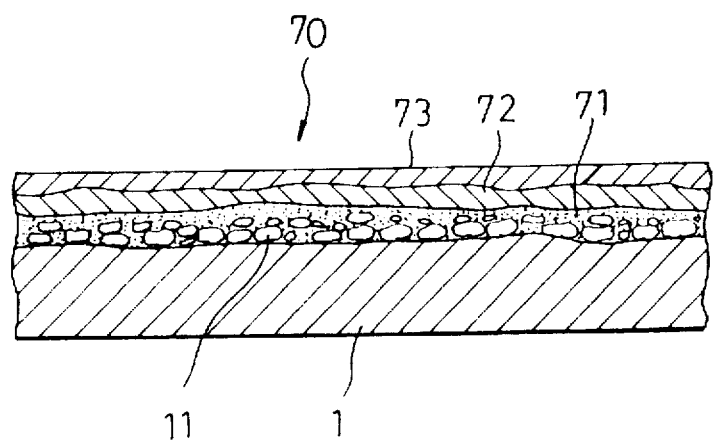
FIG. 5 is a schematic sectional view of the metal cookware coated in accordance with the method of this invention.

FIGS. 3 to 5 show an anti-stick layer 70 applied over the scratch-resistant layer 11 by a known spray coating technique. The anti-stick layer 70 includes a first coating 71, a second coating 72 and a third coating 73. The first coating composition contains fluorocarbon resin comprising perfluoroalkoxy polymers (PFA) and polytetrafluoroethylene (PTFE), a binder resin, a pigment, a surface active agent and a solvent such as water. PFA, PTFE, the binder resin, the pigment and the surface active agent together account for 26–42% of the weight of the first coating composition. The ratio of PTFE to PFA ranges from 55:45 to 60:40. The second coating composition contains PFA, PTFE, the pigment, the surface active agent and the solvent. PFA, PTFE, the pigment and the surface active agent together account for about 40–50% of the weight of the second coating composition. The ratio of PTFE to PFA is about 55:45. The third coating composition contains PFA, PTFE, the surface active agent and the solvent. PFA, PTFE and the surface active agent together account for less than 60% of the weight of the third coating composition. The ratio of PTFE to PFA is about 55:45. The fluorocarbon resin comprising PFA and PTFE in the first, second and third coatings 71, 72, 73 is in the majority with respect to the binder resin, the pigment and the surface active agent, respectively. The amount of the binder resin is approximately ⅓ or less of the amount of the fluorocarbon resin.

Referring to FIG. 3, the composition 7 of the first coating 71 is received via the funnel 31 and is propelled by the compressed gas in the device 2 through the nozzle 3 so as to be sprayed onto the scratch-resistant layer 11 which is already provided on the cooking surface of the metal cookware 1. At this point, the cooking surface is heated to a temperature of 90°–150° C. for 5–10 minutes to dry the first coating 71 sprayed thereon. The thickness of the first coating 71 is about 5–10 μm.

Referring to FIG. 4, the composition (7a) of the second coating 72 is received via the funnel 31 and is propelled by the compressed gas in the containing device 2 through the nozzle 3 so as to be sprayed onto the first coating 71 which is already provided on the cooking surface of the metal cookware 1. At this point, the cooking surface is heated to a temperature of about 95°–100° C. for 5–10 minutes to dry the second coating 72. The thickness of the second coating 72 formed on the cooking surface is about 15–20 μm.

Referring to FIG. 5, the third coating composition is sprayed onto the second coating 72 already on the cooking surface. At this point, the cooking surface is heated to a temperature of 400°–420° C. for 3–5 minutes to dry the third coating 73 sprayed thereon. The thickness of the third coating 73 is about 3–6 μm. The resultant thickness of the anti-stick layer 70, which includes the first, second and third coatings 71, 72, 73, is about 23–36 μm. The fluorocarbon resin, which comprises PTFE and PFA, in the composition of the anti-stick layer is sprayed over the scratch-resistant layer 11 and fills valleys formed on the surface of the scratch-resistant layer 11. The provision of the scratch-resistant layer 11 facilitates the attachment and bonding of the anti-stick layer 70 and increases the hardness of the resultant cooking surface of the metal cookware 1. Furthermore, the anti-stick layer 70 may be formed by spraying from one to five times.

According to the above described coating method, the resultant cooking surface of the metal cookware 1 has an average roughness of 2.5–5.5 μm (Ra) and a pencil hardness of 8–9 H due to the provision of both the scratch-resistant layer 11 and the anti-stick layer 70. Thus, the coated cooking surface has a good non-stick characteristic while maintaining a high level of hardness. Therefore, a metal cookware which is treated with the method of this invention can be non-stick so as to be easily cleaned and is unlikely to be abraded.

The PFA has a crystallinity of about 40–90%, which is lower than that of PTFE. By the use of the mixture of PFA and PTFE, the pores and cleavages within the anti-stick layer 70 can be minimized. Thus, the metallic scratch-resistant layer 11 located under the anti-stick layer 70 can be prevented from rusting. The coated metal cookware according to this invention can therefore have a relatively long service life when compared to the previously described coated metal cookware.

When the coated metal cookware 1 of the present invention is boiled in 5% salt water for 20 minutes and is cooled for 72 hours, diminished rusting of the surface of the metal cookware 1 occurs as compared to the prior art. Therefore, the corrosion resistance of the coating which is formed by employing the method of the present invention is greater than those of the coatings which are formed by employing the conventional methods.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A method for coating metal cookware having a cooking surface, comprising the steps of:

(1) roughening and cleaning said cooking surface of said metal cookware;

(2) applying a metallic scratch-resistant layer onto the roughened and cleaned cooking surface by electric-arc spraying; and (3) applying an anti-stick layer onto said scratch-resistant layer, the improvement comprising:

said step (2) comprising electric-arc spraying a stainless steel and an aluminum alloy onto said cooking surface of said metal cookware in order to improve corrosion resistance of said scratch-resistant layer, said stainless steel consisting of less than 0.2% by weight of carbon, 17–20% by weight of chromium, 7–10% by weight of nickel and the remainder being iron, said aluminum alloy consisting of 0.25% by weight of silicon, 0.4% by weight of iron, 0.10% by weight of copper, 0.05–0.20% by weight of manganese, 4.5–5.5% by weight of magnesium, 0.05–0.20% by weight of chromium, 0.10% by weight of zinc, 0.06–0.20% by weight of titanium, 0.15% by weight of impurities and the remainder being aluminum.

2. The coating method as claimed in claim 1, wherein said scratch-resistant layer has a thickness about of 150 µm.

* * * * *